Dec. 30, 1947.  C. A. LA PLANTE  2,433,464
WORK SUPPORTING APPARATUS FOR WELDING MACHINES
Filed May 18, 1945  2 Sheets-Sheet 1

Inventor
Clarence A. LaPlante
By W. S. McDowell
Attorney

Dec. 30, 1947.                C. A. LA PLANTE                2,433,464
WORK SUPPORTING APPARATUS FOR WELDING MACHINES
Filed May 18, 1945                       2 Sheets-Sheet 2
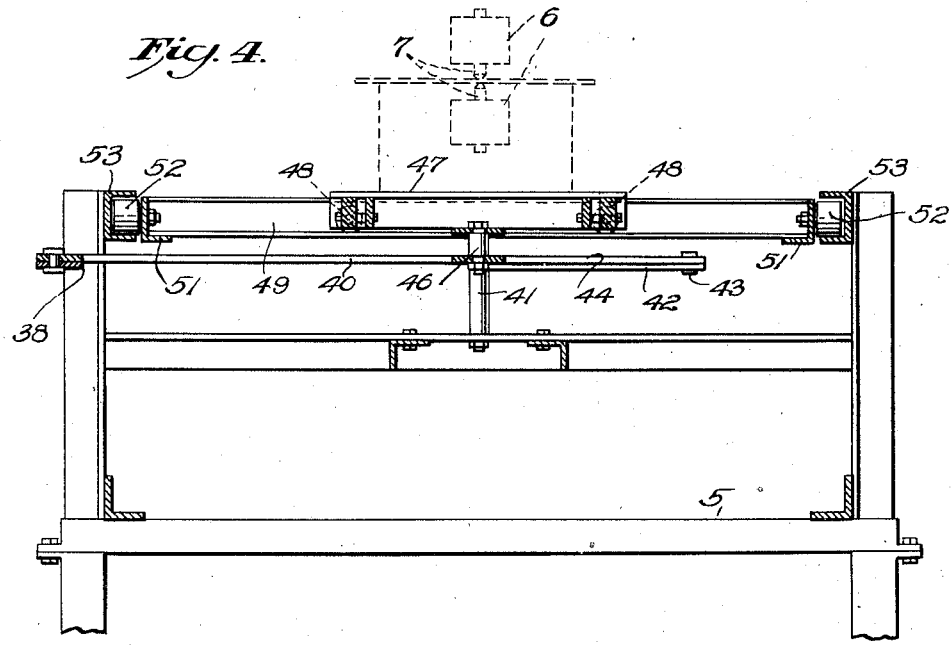
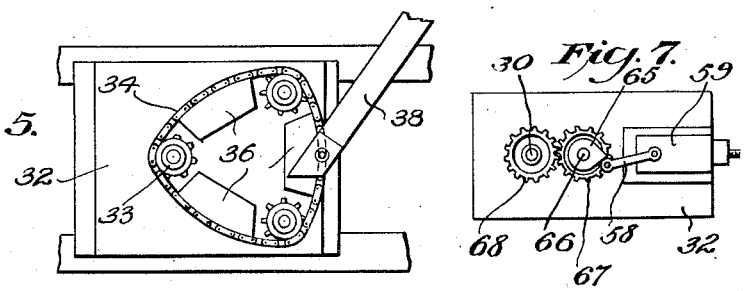
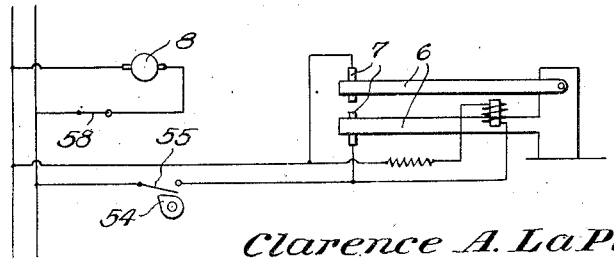
Inventor
Clarence A. La Plante Patented Dec. 30, 1947

2,433,464

UNITED STATES PATENT OFFICE 2,433,464

WORK-SUPPORTING APPARATUS FOR WELDING MACHINES

Clarence A. La Plante, Columbus, Ohio, assignor to Clark Grave Vault Company, Columbus, Ohio, a corporation of Ohio Application May 18, 1945, Serial No. 594,417

5 Claims. (Cl. 219—17)

This invention relates to an improved apparatus for supporting and presenting objects to be welded to the electrodes of a welding machine, and has for an object to provide automatic work-supporting apparatus by which the work is moved relative to the welding electrodes in order that the work may be welded in patterns of predetermined form.

Another object is to provide work-supporting apparatus of this character in which a table, on which the work is clamped is mounted for movement transversely and longitudinally of the stationary frame structure of the apparatus, the movement of the table being effected by a motor driven endless chain with which is associated a series of pantographic arms, whereby the table moves at a multiplied rate but in accordance with the orbital pattern of the endless chain.

Other objects reside in the provision of simple and automatic apparatus for presenting work to a welding machine in such manner as to weld the work along margins or areas of any desired configuration; to provide means for imparting intermittent movement to the movable work-supporting table to present different welding positions thereon to the electrodes of the associated welding machine; to provide the apparatus with circuit-controlling switches by which the welding machine is energized when the table is at rest and to stop automatically the operation of the endless pattern-producing chain at the conclusion of the welding operations on a given piece of work; and to provide various other improvements by which successive welding operations may be performed on the work in an automatic and mechanical manner and without necessitating the services and attention of an operator.

For a further understanding of the invention, and additional objects and advantages thereof, reference is to be had to the following description and the accompanying drawing, wherein:

Fig. 4 is a transverse vertical sectional view on the line 4—4 of Fig. 1;

Fig. 5 is a detail plan view of the pattern-producing means for operating the pantograph lever system;

Fig. 6 is a diagrammatic view of the circuits employed;

Fig. 7 is a detail bottom plan view showing a modified form of drive for operating the cut-out switch.

Figure 1:
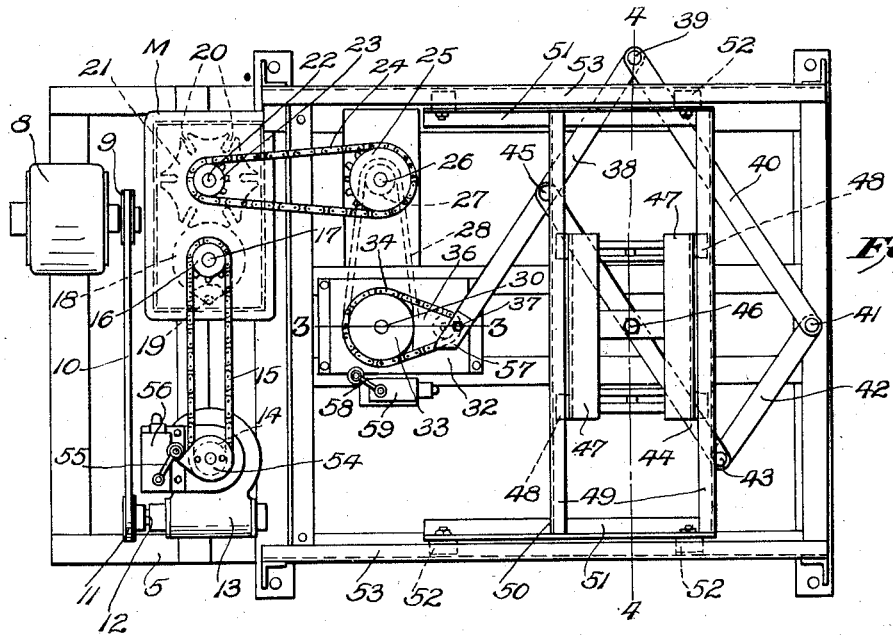
Fig. 1 is a top plan view of the improved work-supporting apparatus comprising the present invention.
Figure 2:
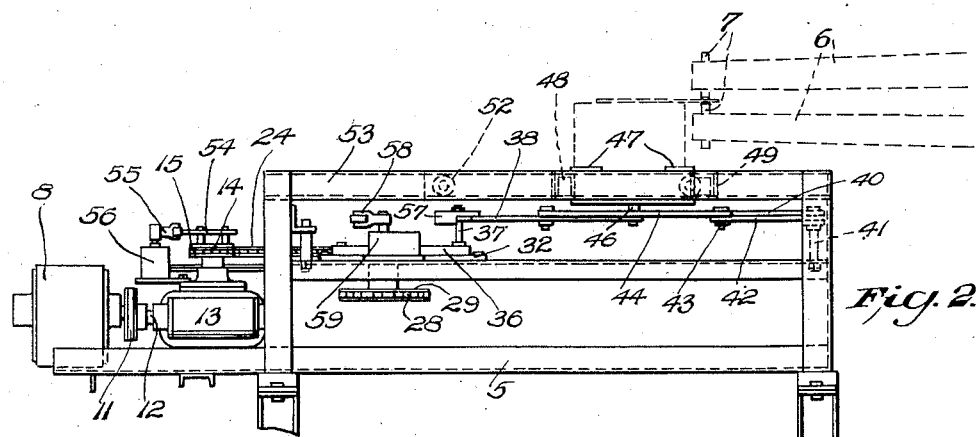
Fig. 2 is a side elevational veiw thereof.
Figure 3:
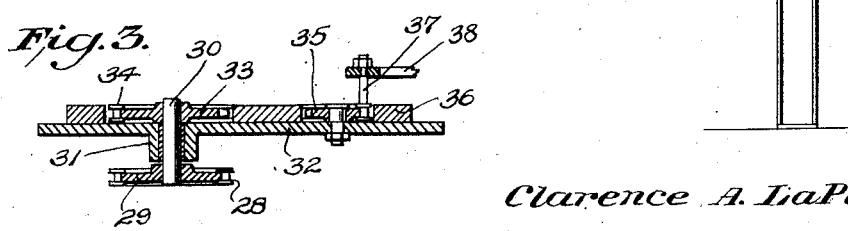
Fig. 3 is a detail vertical longitudinal sectional view taken on the plane indicated by the line 3—3 of Fig. 1.

In the single specific embodiment of the invention set forth in the drawing, the numeral 5 designates a floor-mounted stationary frame composed preferably of interconnected structural steel members united in rigid order, the frame being located so that the rear end thereof is arranged immediately beneath the relatively movable jaws 6 of an electrically operated welding machine, the outer ends of said jaws carrying the usual separable welding electrodes 7. As previously stated, the purpose of my improved apparatus is to present work automatically to the electrodes, so that a series of welding operations may be performed on the work in patterns of any desired configuration. For instance, it may be desirable to weld a pair of sheet metal plates together around the margins of an eliptical opening formed therein, and the present invention provides a work-supporting table which is so operated to move the work secured thereon relative to the electrodes to produce welding patterns of any desired configuration.

To this end, the frame 5 supports at its forward end an electric motor 8, the armature shaft of which is provided with a belt wheel 9 which drives an endless belt 10, the belt being also trained over a second belt wheel 11 carried by the driving shaft 12 of a speed-reducing mechanism 13. The driven shaft of this mechanism has fixed thereto a sprocket 14 around which passes an endless chain 15, the latter being also trained over a second sprocket 16 which is fixed to the upper end of the driving shaft 17 of a Geneva wheel mechanism, indicated generally at M. The driving element 18 of this mechanism is fixed to the shaft 17 and carries a roller 19 which is adapted, upon rotation of the element 18, to enter successively into the slots 20 provided in the mating driven element 21, whereby to impart intermittent rotary motion to the driven shaft 22 of said mechanism and on which the element 21 is mounted.

The upper end of the shaft 22 carries a sprocket 23 around which passes an endless chain 24, the latter being also trained over a sprocket 25 carried by a vertically extending shaft 26 which is journaled in a bearing on the frame 5. The lower end of the shaft 26 carries a smaller sprocket 27 around which passes an endless chain 28 which, in turn, passes around a second sprocket 29 secured to the lower end of a vertical shaft 30, the latter being journaled, as at 31, in a bearing formed in a stationary frame-carried bed plate 32.

The upper end of the shaft 30, above the upper surface of the bed plate carries a sprocket 33, the teeth of the latter engaging with the links of a pattern-producing horizontally movable endless chain 34. In this instance, the chain 34 has been shown as passing around a single idler 35, which is journaled on the plate 32 in a horizontal plane registering with that of the sprocket 33. However, it will be understood that the pattern of the orbit of movement of the chain 34 may be varied at will. The plate is shown as provided with chain-guiding blocks 36, the latter forming channels in which the chain 34 is received. The marginal configuration of the blocks may be varied as well as the number of idler sprockets used thereon for the purpose of obtaining various welding patterns.

The chain 34 has fixed thereto an upstanding post 37, and connected with the upper end of this post, and mounted for turning movement about its vertical axis, is one end of the arm 38 of a pantographic system of arms. The other end of the arm 38 is pivoted as at 39 to a second arm 40, the latter, in turn, having its opposite end pivoted as at 41 on the frame 5 in connection with the adjoining end of a third arm 42. The other end of the arm 42 is pivoted as at 43 to a fourth arm 44, which has its opposite end pivoted as at 45 to the first arm 38 substantially midway of the length of the latter. The middle region of the arm 44 is joined by means of a stud 46 with the under side of a work-supporting table 47 which is movable longitudinally and transversely of the stationary frame 5 in accordance with the motion imparted thereto by the pantographic lever system.

The table 47 is provided at its ends with rollers 48, which are mounted for movement in guides provided by channel-shaped rails 49 of a movable carriage 50. The longitudinally extending side rails 50 of this carriage are provided with rollers 52 which are movable in stationary channel-shaped rails 53 forming a part of the frame 5. By this arrangement, the table 47 is mounted for movement transversely of the frame 5 by means of the rollers 48 and the carriage rails 49 and, also, longitudinally of the frame 5 in unison with the carriage 50. In this manner, the work, which is suitably clamped to the upper surface of the table 47, is moved precisely in accordance with the orbital movement pattern of the chain 34, using the same or an increased or diminished scale. In cases where such augmented movement of the work is not required, the stud 46 of the table 47 may be connected directly with the chain 34 and the pantographic arms eliminated.

Through the Geneva gearing, intermittent movement is imparted to the table 47 so that the work thereon is moved when the electrodes of the welding machine jaws are separated. The driven shaft of the speed reducing gearing 13 carries, above the sprocket 14, a cam 54. This cam is positioned for engagement with the movable arm 55 of a welding-machine switch 56. The relationship between the cam 54 and the arm 55 is such that when the table 47 is at rest, the welding machine is energized to bring the electrodes 7 into contact with the work and produce a welding operation. Such an operation takes place between each step by step increment of movement of the table and the work thereon.

The arm 38 carries a finger 57 which is positioned to strike a pivot arm 58 of a cut-out switch 59. This switch is wired to the motor 8 so that when the welding operations on a given piece of work have been concluded, the switch 59 is automatically operated to discontinue the operation of the motor 8, thereby stopping the machine so that a new piece of work may be substituted for that upon which the welding operations are completed.

In certain instances, it may be desirable to operate the cut-out switch 59 to stop the operation of the machine to provide for an overlapping of the welding operations. Thus, it may be found that due to improper heating of the welding electrodes, the first few welding steps may not be completely satisfactory and if this condition is found to exist, the same may be corrected by producing a certain amount of overlapping in the orbit of the welding operations. Thus, in Fig. 7, the bottom of the bed plate 32 may carry the cut-out switch 59, and the actuating arm 58 of this switch is adapted to be engaged by a cam 65 fixed to a rotatable shaft 66. This shaft is suitably journaled in bearings carried by the bed plate 32 and carries a gear 67, the teeth of the latter meshing with a complemental gear 68 fixed to the lower end of the shaft 30, below the sprocket 29. By substituting different sized gears, at 67 and 68, the extent of overlapping of the welding operations may be readily varied to meet operating conditions.

In view of the foregoing, it will be seen that the present invention provides an automatic mechanism for presenting work to be welded to a welding machine and moving the work relative to the electrodes of the welding machine to cause the welding operations to follow prescribed or predetermined courses along the margins or face of the work. It is a simple matter to substitute one chain pattern of the type shown at 34 for another so that virtually any welding outline on the work may be carried out. The apparatus being largely automatic in its operation, dispenses with the services of a skilled welder, it being merely necessary for an attendant to remove a finished piece of work from the table and substitute another for that removed.

While I have described what I deem to be a preferred embodiment of my invention, nevertheless, it will be understood that such embodiment is merely illustrative of one of many possible forms, and, therefore, I reserve the right to employ all such variations or modifications of my invention that may be said to fall fairly within the scope of the following claims.

I claim:

1. Apparatus for feeding work to welding machines, comprising a stationary frame, a work-supporting table arranged on and movable both transversely and longitudinally of said frame, an endless pattern-producing device supported on said frame for movement in a confined course in a substantially horizontal plane, means uniting said device with said table to produce movement of the latter in accordance with the course of movement of said device, an electric motor having a controlling circuit, motion-transmitting means driven by said motor for imparting intermittent movement to said device and the table connected therewith, a switch arranged in said motor-controlling circuit, and means actuated by said device for operating said switch, whereby to discontinue operation of said motor following predetermined movement of said device.

2. Apparatus for presenting work to electric welding machines of the type having relatively movable electrode-carrying members and an operating circuit comprising a stationary frame, a work-supporting table arranged on and movable both transversely and longitudinally of said frame in a substantially horizontal plane, an endless pattern-producing device supported in a substantially horizontal plane on said frame for movement in a confined orbital course, a plurality of pivotally united pantographic arms joined with said device, said frame and table for moving the latter in accordance with the course of travel of said device, and motor driven means for imparting intermittent movement to said device, said arms and the table joined therewith.

3. Apparatus for presenting work to welding machines, comprising a stationary frame provided with a pair of longitudinally extending relatively spaced and horizontally disposed guides, a carriage provided with rollers movable longitudinally of said guides, said carriage including a pair of relatively spaced parallel guide bars, a table having rollers thereon mounted for movement on said guide bars and transversely of said frame, an endless pattern-producing chain supported on said frame in a substantially horizontal plane for movement in a confined orbital course, motor-driven means for imparting intermittent movement to said chain, and a set of four pantographic arms for transmitting the movement of said chain traveling in said course to said table, the first of said arms having at one end a movable connection with said chain and at its opposite end a pivotal connection with the outer end of the second of said arms, the latter arm having its inner end pivotally connected with said frame, the third of said arms being pivotally connected with said frame in registration with said last-named pivotal connection, and the opposite end of said third arm being pivotally connected with one end of the fourth of said arms, the opposite end of the fourth of said arms being pivotally connected with the first of said arms intermediately of its length, and a stud connection uniting the intermittent portion of said fourth arm with said table.

4. Apparatus for presenting work to welding machines, comprising a stationary frame, a work-supporting table mounted on and movable both transversely and longitudinally of said frame, an endless pattern-producing chain supported on said frame for movement in a substantially horizontal plane and in a confined orbital course, an electric motor, speed-reducing mechanism including a driven shaft, Geneva gearing driven by said shaft, motion transmitting means operated by the driven element of said Geneva gearing for imparting intermittent movement to said pattern-producing chain, and pantographic arms movably connected with said frame, chain and table for imparting movement to the latter in accordance with the course configuration of said chain.

5. Apparatus for presenting work to welding machines, comprising a stationary frame, a work-supporting table mounted on and movable both transversely and longitudinally of said frame, an endless pattern-producing chain supported on said frame for movement in a substantially horizontal plane and in a confined orbital course, an electric motor, speed-reducing mechanism including a driven shaft, Geneva gearing driven by said shaft, motion-transmitting means operated by the driven element of said Geneva gearing for imparting intermittent movement to said pattern-producing chain, pantographic arms movably connected with said frame, chain and table for imparting movement to the latter in accordance with the course configuration of said chain, a switch for the operating circuit of said motor, and means actuated by said chain for operating said switch to discontinue operation of said motor following predetermined movement of said chain.

CLARENCE A. LA PLANTE.

REFERENCES CITED

The following references are of record in the file of this patent:

UNITED STATES PATENTS

| Number | Name | Date |
|---|---|---|
| 728,556 | Eaton | May 19, 1903 |
| 790,172 | Benton | May 16, 1920 |
| 1,359,545 | Strabino | Nov. 23, 1920 |
| 1,792,066 | Bowlus | Feb. 10, 1931 |
| 1,975,578 | Kennedy et al. | Oct. 2, 1934 |
| 1,981,708 | Ragsdale et al. | Nov. 20, 1934 |
| 2,007,717 | Harley | July 9, 1935 |
| 2,172,313 | Young | Sept. 5, 1939 |
| 2,355,576 | Werfel | Aug. 8, 1944 |